United States Patent
Whitehead

(10) Patent No.: US 7,760,417 B2
(45) Date of Patent: Jul. 20, 2010

(54) BRIGHTNESS ENHANCEMENT BY FLUID INTERFACE DEFORMATION IN TIR-MODULATED DISPLAYS

(75) Inventor: Lorne A. Whitehead, Vancouver (CA)

(73) Assignee: The University of British Columbia, Vancouver, British Columbia (CA)

(*) Notice: Subject to any disclaimer, the term of this patent is extended or adjusted under 35 U.S.C. 154(b) by 190 days.

(21) Appl. No.: 12/161,045

(22) PCT Filed: Jan. 15, 2007

(86) PCT No.: PCT/CA2007/000060
§ 371 (c)(1),
(2), (4) Date: Jul. 16, 2008

(87) PCT Pub. No.: WO2007/082369
PCT Pub. Date: Jul. 26, 2007

(65) Prior Publication Data
US 2010/0128340 A1 May 27, 2010

Related U.S. Application Data

(60) Provisional application No. 60/759,772, filed on Jan. 17, 2006.

(51) Int. Cl.
G02F 1/167 (2006.01)
G02B 26/00 (2006.01)
G02B 27/10 (2006.01)
G02B 6/42 (2006.01)
G02B 6/26 (2006.01)

(52) U.S. Cl. .................. 359/296; 359/290; 359/620; 385/30; 385/33

(58) Field of Classification Search .............. 359/290, 359/292, 296, 620, 626, 627; 385/18, 30, 385/33
See application file for complete search history.

(56) References Cited

U.S. PATENT DOCUMENTS
5,999,307 A 12/1999 Whitehead et al.
(Continued)

FOREIGN PATENT DOCUMENTS
JP 2004286976 A 10/2004
WO WO 2006/108285 10/2006

OTHER PUBLICATIONS

A High Reflectance, Wide Viewing Angle Reflective Display Using Total Internal Reflection in Micro-Hemispheres, Mossman, M.A. et al., Society for Information Display, 23rd International Display Research Conference, pp. 233-236, Sep. 15-18, 2003, Phoenix, AZ.
Hattori, R. et al., "Novel Bistable Reflective Display Using Quick-Response Liquid Powder," Society for Information Display Symposium 2003, pp. 846-849.
Hayes et al. in "Video-Speed Electronic Paper Based on Electrowetting," vol. 425, pp. 383-385, Sep. 25, 2003.

(Continued)

*Primary Examiner*—David N Spector
(74) *Attorney, Agent, or Firm*—Oyen Wiggs Green & Mutala LLP

(57) ABSTRACT

A reflective display having a plurality of transparent hemi-beads (120), each having a reflective region (80) surrounding a non-reflective region (82). Each hemi-bead has an associated light absorptive fluid droplet (122) having a normally relaxed shape contacting the non-reflective region, thereby frustrating total internal reflection of light rays at the droplet/hemi-bead interface. An electrical potential is selectably applied across selected droplets. Application of the electrical potential across a droplet deforms the droplet away from the hemi-bead associated with the droplet, such that light rays (158) incident on the non-reflective region are refracted toward substrate (124) and reflected back through hemi-bead (120) in an approximately opposite direction (166); and such that light rays (162) incident on the reflective region are semi-retro-reflected (168). Removal of the electrical potential allows the droplet to resume the relaxed shape.

21 Claims, 9 Drawing Sheets

U.S. PATENT DOCUMENTS

| | | | |
|---|---|---|---|
| 6,064,784 A | 5/2000 | Whitehead et al. | |
| 6,215,920 B1 | 4/2001 | Whitehead et al. | |
| 6,865,011 B2 | 3/2005 | Whitehead et al. | |
| 6,885,496 B2 | 4/2005 | Whitehead et al. | |
| 6,891,658 B2 | 5/2005 | Whitehead et al. | |
| 7,164,536 B2 * | 1/2007 | Whitehead | 359/618 |
| 2003/0165016 A1 | 9/2003 | Whitehead et al. | |
| 2004/0160684 A1 | 8/2004 | Prins et al. | |
| 2006/0209418 A1 | 9/2006 | Whitehead | |
| 2009/0262414 A1 * | 10/2009 | Whitehead | 359/296 |

OTHER PUBLICATIONS

Kishi et al. in "Development in In-Plane EPD," pp. 24-27, Proceedings of the Society for Information Display Symposium 2000.

Swanson et al. in "High Performance Electrophoretic Displays," pp. 29-31 Proceedings of the Society for Information Display Symposium 2000.

Aggarwal et al. in "Liquid Transport Based on Electrostatic Deformation of Fluid Interfaces" Journal of Applied Physics 99, 104904 published online May 25, 2006.

* cited by examiner

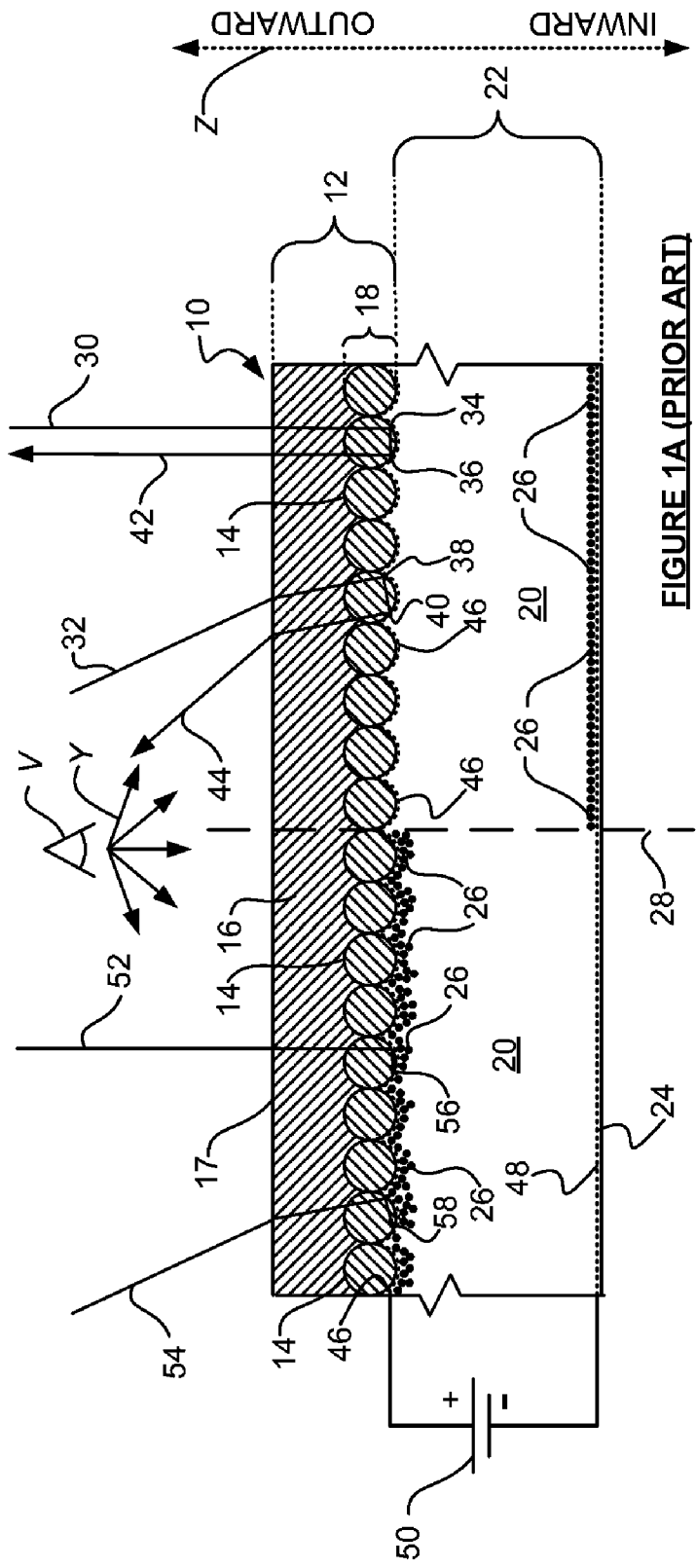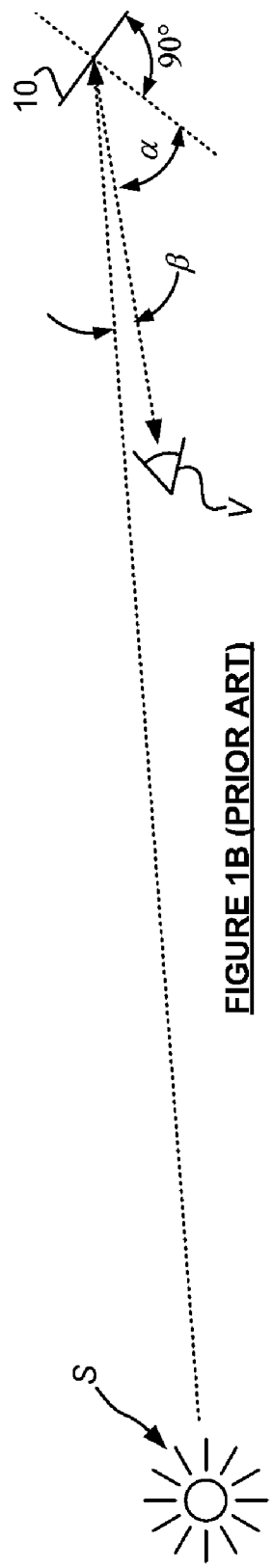
FIGURE 1A (PRIOR ART)
FIGURE 1B (PRIOR ART)

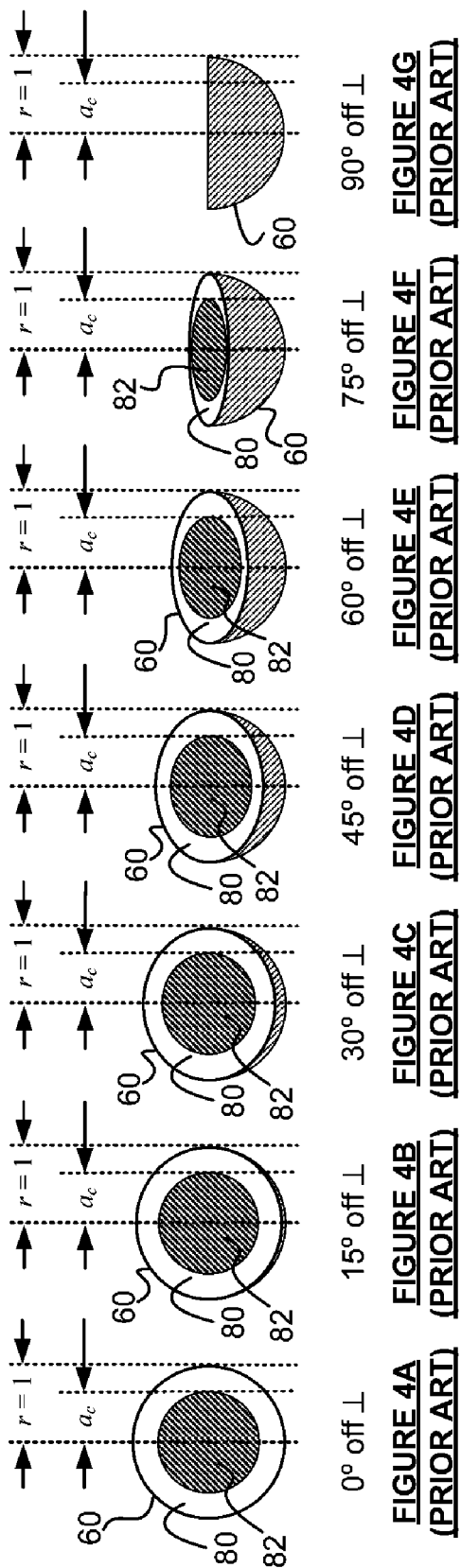

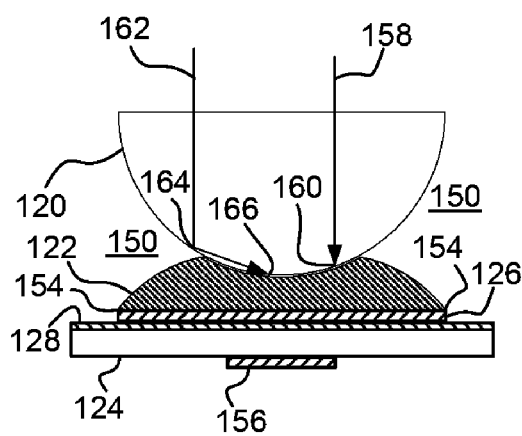
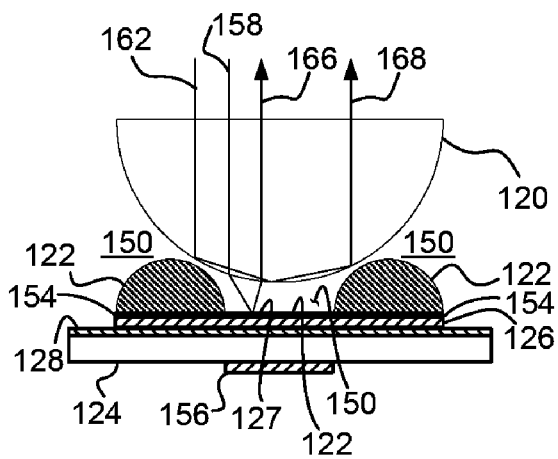
FIGURE 7A
FIGURE 7B
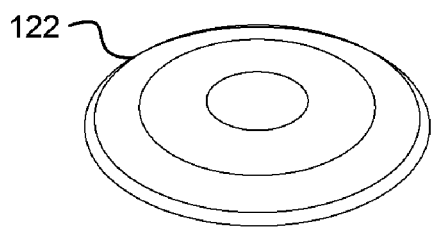
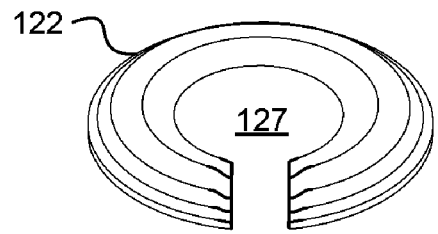
FIGURE 8A
FIGURE 8B

US 7,760,417 B2

BRIGHTNESS ENHANCEMENT BY FLUID INTERFACE DEFORMATION IN TIR-MODULATED DISPLAYS

REFERENCE TO RELATED APPLICATION

This application claims the benefit of U.S. provisional patent application Ser. No. 60/759,772 filed 17 Jan. 2006.

TECHNICAL FIELD

This application pertains to brightness enhancement of reflective image displays of the type described in U.S. Pat. Nos. 5,999,307; 6,064,784; 6,215,920; 6,865,011; 6,885,496 and 6,891,658; in U.S. Patent Application Publication No. 2006-0209418-A1; and in International Patent Publication No. WO 2006/108285 all of which are incorporated herein by reference.

BACKGROUND

FIG. 1A depicts a portion of a prior art reflective (i.e. front-lit) image display 10 in which total internal reflection (TIR) is electrophoretically modulated as described in U.S. Pat. Nos. 6,885,496 and 6,891,658. Display 10 includes a transparent outward sheet 12 formed by partially embedding a large plurality of high refractive index (e.g. $\eta_1 > \sim 1.90$) transparent spherical or approximately spherical beads 14 in the inward surface of a high refractive index (e.g. $\eta_2 > \sim 1.75$) polymeric material 16 having a flat outward viewing surface 17 which viewer V observes through an angular range of viewing directions Y. The "inward" and "outward" directions are indicated by double-headed arrow Z. Beads 14 are packed closely together to form an inwardly projecting monolayer 18 having a thickness approximately equal to the diameter of one of beads 14. Ideally, each one of beads 14 touches all of the beads immediately adjacent to that one bead. Minimal interstitial gaps (ideally, no gaps) remain between adjacent beads.

An electrophoresis medium 20 is maintained adjacent the portions of beads 14 which protrude inwardly from material 16 by containment of medium 20 within a reservoir 22 defined by lower sheet 24. An inert, low refractive index (i.e. less than about 1.35), low viscosity, electrically insulating liquid such as Fluorinert™ perfluorinated hydrocarbon liquid ($\eta_3 \sim 1.27$) available from 3M, St. Paul, Minn. is a suitable electrophoresis medium. Other liquids, or water can also be used as electrophoresis medium 20. A bead:liquid TIR interface is thus formed. Medium 20 contains a finely dispersed suspension of light scattering and/or absorptive particles 26 such as pigments, dyed or otherwise scattering/absorptive silica or latex particles, etc. Sheet 24's optical characteristics are relatively unimportant: sheet 24 need only form a reservoir for containment of electrophoresis medium 20 and particles 26, and serve as a support for backplane electrode 48.

As is well known, the TIR interface between two media having different refractive indices is characterized by a critical angle $\theta_c$. Light rays incident upon the interface at angles less than $\theta_c$ are transmitted through the interface. Light rays incident upon the interface at angles greater than $\theta_c$ undergo TIR at the interface. A small critical angle is preferred at the TIR interface since this affords a large range of angles over which TIR may occur.

In the absence of electrophoretic activity, as is illustrated to the right of dashed line 28 in FIG. 1A, a substantial fraction of the light rays passing through sheet 12 and beads 14 undergoes TIR at the inward side of beads 14. For example, incident light rays 30, 32 are refracted through material 16 and beads 14. The rays undergo TIR two or more times at the bead:liquid TIR interface, as indicated at points 34, 36 in the case of ray 30; and indicated at points 38, 40 in the case of ray 32. The totally internally reflected rays are then refracted back through beads 14 and material 16 and emerge as rays 42, 44 respectively, achieving a "white" appearance in each reflection region or pixel.

A voltage can be applied across medium 20 via electrodes 46, 48 (shown as dashed lines) which can for example be applied by vapour-deposition to the inwardly protruding surface portion of beads 14 and to the outward surface of sheet 24. Electrode 46 is transparent and substantially thin to minimize its interference with light rays at the bead:liquid TIR interface. Backplane electrode 48 need not be transparent. If electrophoresis medium 20 is activated by actuating voltage source 50 to apply a voltage between electrodes 46, 48 as illustrated to the left of dashed line 28, suspended particles 26 are electrophoretically moved into the region where the evanescent wave is relatively intense (i.e. within 0.25 micron of the inward surfaces of inwardly protruding beads 14, or closer). When electrophoretically moved as aforesaid, particles 26 scatter or absorb light, thus frustrating TIR by modifying the imaginary and possibly the real component of the effective refractive index at the bead:liquid TIR interface. This is illustrated by light rays 52, 54 which are scattered and/or absorbed as they strike particles 26 inside the thin (~0.5 µm) evanescent wave region at the bead:liquid TIR interface, as indicated at 56, 58 respectively, thus achieving a "dark" appearance in each TIR-frustrated non-reflective absorption region or pixel. Particles 26 need only be moved outside the thin evanescent wave region, by suitably actuating voltage source 50, in order to restore the TIR capability of the bead:liquid TIR interface and convert each "dark" non-reflective absorption region or pixel to a "white" reflection region or pixel.

As described above, the net optical characteristics of outward sheet 12 can be controlled by controlling the voltage applied across medium 20 via electrodes 46, 48. The electrodes can be segmented to control the electrophoretic activation of medium 20 across separate regions or pixels of sheet 12, thus forming an image.

FIG. 2 depicts, in enlarged cross-section, an inward hemispherical or "hemi-bead" portion 60 of one of spherical beads 14. Hemi-bead 60 has a normalized radius $r=1$ and a refractive index $\eta_1$. A light ray 62 perpendicularly incident (through material 16) on hemi-bead 60 at a radial distance $\alpha$ from hemi-bead 60's centre C encounters the inward surface of hemi-bead 60 at an angle $\theta_1$ relative to radial axis 66. For purposes of this theoretically ideal discussion, it is assumed that material 16 has the same refractive index as hemi-bead 60 (i.e. $\eta_1 = \eta_2$), so ray 62 passes from material 16 into hemi-bead 60 without refraction. Ray 62 is refracted at the inward surface of hemi-bead 60 and passes into electrophoretic medium 20 as ray 64 at an angle $\theta_2$ relative to radial axis 66.

Now consider incident light ray 68 which is perpendicularly incident (through material 16) on hemi-bead 60 at a distance $$a_c = \frac{\eta_3}{\eta_1}$$

from hemi-bead 60's centre C. Ray 68 encounters the inward surface of hemi-bead 60 at the critical angle $\theta_c$ (relative to radial axis 70), the minimum required angle for TIR to occur. Ray 68 is accordingly totally internally reflected, as ray 72, which again encounters the inward surface of hemi-bead 60 at the critical angle $\theta_c$. Ray 72 is accordingly totally internally reflected, as ray 74, which also encounters the inward surface of hemi-bead 60 at the critical angle $\theta_c$. Ray 74 is accordingly totally internally reflected, as ray 76, which passes perpendicularly through hemi-bead 60 into the embedded portion of bead 14 and into material 16. Ray 68 is thus reflected back as ray 76 in a direction approximately opposite that of incident ray 68.

All light rays which are incident on hemi-bead 60 at distances $\alpha \geq \alpha_c$ from hemi-bead 60's centre C are reflected back (but not exactly retro-reflected) toward the light source; which means that the reflection is enhanced when the light source is overhead and slightly behind the viewer, and that the reflected light has a diffuse characteristic giving it a white appearance, which is desirable in reflective display applications. FIGS. 3A, 3B and 3C depict three of hemi-bead 60's reflection modes. These and other modes coexist, but it is useful to discuss each mode separately.

In FIG. 3A, light rays incident within a range of distances $\alpha_c < \alpha \leq \alpha_1$ undergo TIR twice (the 2-TIR mode) and the reflected rays diverge within a comparatively wide arc $\phi_1$ centered on a direction opposite to the direction of the incident light rays. In FIG. 3B, light rays incident within a range of distances $\alpha_1 < \alpha \leq \alpha_2$ undergo TIR three times (the 3-TIR mode) and the reflected rays diverge within a narrower arc $\phi_2 < \phi_1$ which is again centered on a direction opposite to the direction of the incident light rays. In FIG. 3C, light rays incident within a range of distances $\alpha_2 < \alpha \leq \alpha_3$ undergo TIR four times (the 4-TIR mode) and the reflected rays diverge within a still narrower arc $\phi_3 < \phi_2$ also centered on a direction opposite to the direction of the incident light rays. Hemi-bead 60 thus has a "semi-retro-reflective," partially diffuse reflection characteristic, causing display 10 to have a diffuse appearance akin to that of paper.

Display 10 has relatively high apparent brightness, comparable to that of paper, when the dominant source of illumination is behind the viewer, within a small angular range. This is illustrated in FIG. 1B which depicts the wide angular range $\alpha$ over which viewer V is able to view display 10, and the angle $\beta$ which is the angular deviation of illumination source S relative to the location of viewer V. Display's 10's high apparent brightness is maintained as long as $\beta$ is not too large. At normal incidence, the reflectance R of hemi-bead 60 (i.e. the fraction of light rays incident on hemi-bead 60 that reflect by TIR) is given by equation (1):

$$R = 1 - \left(\frac{\eta_3}{\eta_1}\right)^2 \quad (1)$$

where $\eta_1$ is the refractive index of hemi-bead 60 and $\eta_3$ is the refractive index of the medium adjacent the surface of hemi-bead 60 at which TIR occurs. Thus, if hemi-bead 60 is formed of a lower refractive index material such as polycarbonate ($\eta_1 \sim 1.59$) and if the adjacent medium is Fluorinert ($\eta_3 \sim 1.27$), a reflectance R of about 36% is attained, whereas if hemi-bead 60 is formed of a high refractive index nano-composite material ($\eta_1 \sim 1.92$) a reflectance R of about 56% is attained. When illumination source S (FIG. 1B) is positioned behind viewer V's head, the apparent brightness of display 10 is further enhanced by the aforementioned semi-retro-reflective characteristic.

As shown in FIGS. 4A-4G, hemi-bead 60's reflectance is maintained over a broad range of incidence angles, thus enhancing display 10's wide angular viewing characteristic and its apparent brightness. For example, FIG. 4A shows hemi-bead 60 as seen from perpendicular incidence—that is, from an incidence angle offset 0° from the perpendicular. In this case, the portion 80 of hemi-bead 60 for which $\alpha \geq \alpha_c$ appears as an annulus. The annulus is depicted as white, corresponding to the fact that this is the region of hemi-bead 60 which reflects incident light rays by TIR, as aforesaid. The annulus surrounds a circular region 82 which is depicted as dark, corresponding to the fact that this is the non-reflective region of hemi-bead 60 within which incident rays are absorbed and do not undergo TIR. FIGS. 4B-4G show hemi-bead 60 as seen from incident angles which are respectively offset 15°, 30°, 45°, 60°, 75° and 90° from the perpendicular. Comparison of FIGS. 4B-4G with FIG. 4A reveals that the observed area of reflective portion 80 of hemi-bead 60 for which $\alpha \geq \alpha_c$ decreases only gradually as the incidence angle increases. Even at near glancing incidence angles (e.g. FIG. 4F) an observer will still see a substantial part of reflective portion 80, thus giving display 10 a wide angular viewing range over which high apparent brightness is maintained.

An estimate of the reflectance of an array of hemispheres corresponding to the inward "hemi-bead" portions of each one of spherical beads 14 depicted in FIG. 1A can be obtained by multiplying the reflectance of an individual hemi-bead by the hemi-beads' packing efficiency coefficient f. Calculation of the packing efficiency coefficient f of a closely packed structure involves application of straightforward geometry techniques which are well known to persons skilled in the art. The hexagonal closest packed (HCP) structure depicted in FIG. 5 yields a packing efficiency $f \propto \pi/(6 \cdot \tan 30°) \sim 90.7\%$ assuming beads 14 are of uniform size.

Although the HCP structure yields the highest packing density for hemispheres, it is not necessary to pack the hemi-beads in a regular arrangement, nor is it necessary that the hemi-beads be of uniform size. A random distribution of non-uniform size hemi-beads having diameters within a range of about 1-50 μm has a packing density of approximately 80%, and has an optical appearance substantially similar to that of an HCP arrangement of uniform size hemi-beads. For some reflective display applications, such a randomly distributed arrangement may be more practical to manufacture, and for this reason, somewhat reduced reflectance due to less dense packing may be acceptable. However, for simplicity, the following description focuses on the FIG. 5 HCP arrangement of uniform size hemi-beads, and assumes the use of materials which yield a refractive index ratio $\eta_1/\eta_3 = 1.5$. These factors are not to be considered as limiting the scope of this disclosure.

As previously explained in relation to FIG. 2, a substantial portion of light rays which are perpendicularly incident on the flat outward face of hemi-bead 60 at distances $\alpha < \alpha_c$ from hemi-bead 60's centre C do not undergo TIR and are therefore not reflected by hemi-bead 60. Instead, a substantial portion of such light rays are scattered and/or absorbed by prior art display 10, yielding a dark non-reflective circular region 82 (FIGS. 4A-4G) on hemi-bead 60. FIG. 5 depicts a plurality of these dark non-reflective regions 82, each of which is surrounded by a reflective annular region 80, as previously explained.

Hemi-bead 60's average surface reflectance, R, is determined by the ratio of the area of reflective annulus 80 to the total area comprising reflective annulus 80 and dark circular region 82. That ratio is in turn determined by the ratio of the refractive index, $\eta_1$, of hemi-bead 60 to the refractive index, $\eta_3$, of the medium adjacent the surface of hemi-bead 60 at which TIR occurs, in accordance with Equation (1). It is thus apparent that the average surface reflectance, R, increases with the ratio of the refractive index $\eta_1$, of hemi-bead 60 to that of the adjacent medium $\eta_3$. For example, the average surface reflectance, R, of a hemispherical water drop ($\eta_1 \sim 1.33$) in air ($\eta_3 \sim 1.0$) is about 43%; the average surface reflectance, R, of a glass hemisphere ($\eta_1 \sim 1.5$) in air is about 55%; and the average surface reflectance, R, of a diamond hemisphere ($\eta_1 \sim 2.4$) in air exceeds 82%.

Although it may be convenient to fabricate display 10 using spherically (or hemispherically) shaped beads as aforesaid, even if spherical (or hemispherical) beads 14 are packed together as closely as possible within monolayer 18 (FIG. 1A), interstitial gaps 84 (FIG. 5) unavoidably remain between adjacent beads. Light rays incident upon any of gaps 84 are "lost" in the sense that they pass directly into electrophoretic medium 20, producing undesirable dark spots on viewing surface 17. While these spots are invisibly small, and therefore do not detract from display 10's appearance, they do detract from viewing surface 17's net average surface reflectance, R.

The above-described "semi-retro-reflective" characteristic is important in a reflective display because, under typical viewing conditions where light source S is located above and behind viewer V, a substantial fraction of the reflected light is returned toward viewer V. This results in an apparent reflectance which exceeds the value $$R = 1 - \left(\frac{\eta_3}{\eta_1}\right)^2$$

by a "semi-retro-reflective enhancement factor" of about 1.5 (see "A High Reflectance, Wide Viewing Angle Reflective Display Using Total Internal Reflection in Micro-Hemispheres," Mossman, M. A. et al., Society for Information Display, 23rd International Display Research Conference, pages 233-236, Sep. 15-18, 2003, Phoenix, Ariz.). For example, in a system where the refractive index ratio $\eta_1/\eta_3=1.5$, the average surface reflectance, R, of 55% determined in accordance with Equation (1) is enhanced to approximately 85% under the semi-retro-reflective viewing conditions described above.

Individual hemi-beads 60 can be invisibly small, within the range of 2-50 μm in diameter, and as shown in FIG. 5 they can be packed into an array to create a display surface that appears highly reflective due to the large plurality of tiny, adjacent, reflective annular regions 80. In these regions 80, where TIR can occur, particles 26 (FIG. 1A) do not impede the reflection of incident light when they are not in contact with the inward, hemispherical portions of beads 14. However, in regions 82 and 84, where TIR does not occur, particles 26 may absorb incident light rays—even if particles 26 are moved outside the evanescent wave region so that they are not in optical contact with the inward, hemispherical portions of beads 14. The refractive index ratio $\eta_1/\eta_3$ can be increased in order to increase the size of each reflective annular region 80 and thus reduce such absorption losses. Non-reflective regions 82, 84 cumulatively reduce display 10's overall surface reflectance, R. Since display 10 is a reflective display, it is clearly desirable to minimize such reduction.

Disregarding the aforementioned semi-retro-reflective enhancement factor, a system having a refractive index ratio $\eta_1/\eta_3=1.5$ has an average surface reflectance, R, of 55%, as previously explained. Given the HCP arrangement's aforementioned packing efficiency of about 91%, the system's overall average surface reflectance is 91% of 55% or about 50%, implying a loss of about 50%. 41% of this loss is due to light absorption in circular non-reflective regions 82; the remaining 9% of this loss is due to light absorption in interstitial non-reflective gaps 84. Display 10's reflectance can be increased by decreasing such absorptive losses through the use of materials having specific selected refractive index values, optical microstructures or patterned surfaces placed on the outward or inward side(s) of monolayer 18 (FIG. 1A).

For example, since display 10's maximum surface reflectance is determined by the ratio of the refractive index values of hemi-bead 60 and electrophoretic medium 20, the reflectance can be increased by substituting air (refractive index=1.0) as electrophoretic medium 20 instead of a low refractive index liquid (refractive index less than 1.35).

Display 10's surface reflectance can be increased, as described below, without using particles suspended in an electrophoretic medium.

The foregoing examples of the related art and limitations related thereto are intended to be illustrative and not exclusive. Other limitations of the related art will become apparent to those of skill in the art upon a reading of the specification and a study of the drawings.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIG. 1A is a greatly enlarged, not to scale, fragmented cross-sectional side elevation view of a portion of a prior art reflective image display in which TIR is electrophoretically modulated.

FIG. 1B schematically illustrates the wide angle viewing range α of the FIG. 1A display, and the angular range β of the illumination source.

FIGS. 4A, 4B, 4C, 4D, 4E, 4F and 4G depict the FIG. 2 hemi-bead, as seen from viewing angles which are offset 0°, 15°, 30°, 45°, 60°, 75° and 90° respectively from the perpendicular.

FIGS. 7A and 7B are cross-sectional side elevation views, on a greatly enlarged scale, of a reflective display hemi-bead in which TIR is modulated by electro-deformation of a fluid interface, with FIG. 7A depicting the relaxed, TIR-frustrated (non-reflective) state and FIG. 7B depicting the electro-deformed, TIR-enabled (reflective) state.

FIGS. 8A and 8B are oblique schematic pictorial illustrations of the fluid droplet of FIGS. 7A and 7B respectively, with FIG. 8A depicting the relaxed, TIR-frustrated (non-reflective) state and FIG. 8B depicting the electro-deformed, TIR-enabled (reflective) state.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 6A:
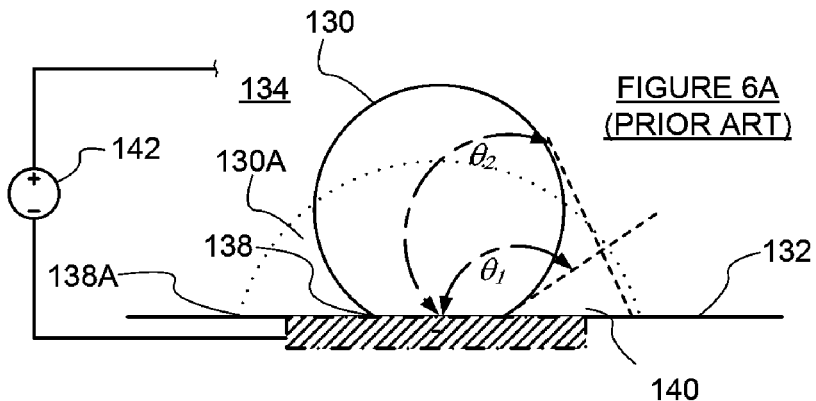
FIGS. 6A and 6B are schematic, cross-sectional side elevation and top plan views respectively, on a greatly enlarged scale, depicting a prior art fluid (water) droplet submerged in a fluid (air) background medium and electro-wetting a solid surface.
Figure 6B:
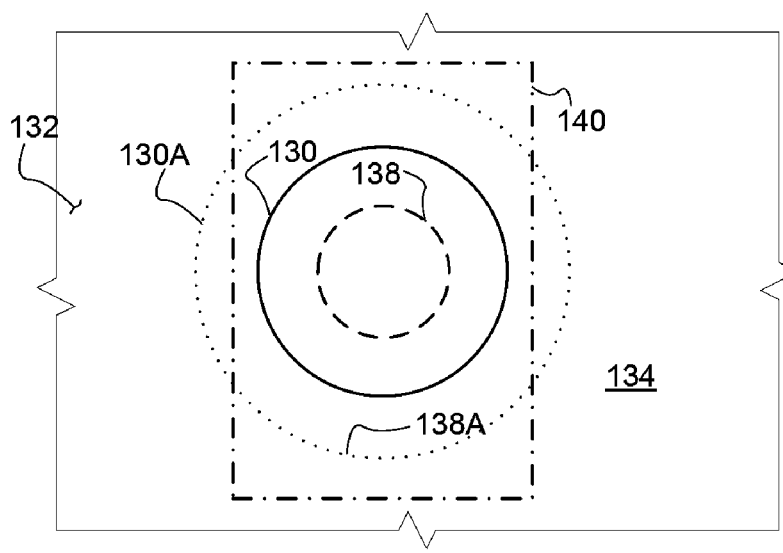

It is useful to review some aspects of the electro-wetting phenomenon. FIGS. 6A and 6B depict a first fluid (e.g. water) droplet 130 on a uniform, homogeneous, solid surface 132. Droplet 130 and surface 132 are submerged in a second fluid (e.g. air) background medium 134. In the absence of external forces, such as friction, droplet 130 (shown in solid outline in FIGS. 6A and 6B) assumes a smooth, semi-spherical shape on surface 132.

Droplet 130, surface 132 and medium 134 intersect at three interfaces: (1) the interface between droplet 130 and surface 132; (2) the interface between droplet 130 and background medium 134; and (3) the interface between surface 132 and background medium 134. Each interface is characterized by a well-defined surface tension or surface energy, as described by Young's equation:

$$\gamma_{SD} + \gamma_{DB} \cos\theta_1 - \gamma_{SB} = 0$$

where, $\gamma_{SD}$ is the surface tension or surface energy at the interface between droplet 130 and surface 132; $\gamma_{DB}$ is the surface tension or surface energy at the interface between droplet 130 and background medium 134; $\gamma_{SB}$ is the surface tension or surface energy at the interface between surface 132 and background medium 134; and $\theta_1$ is the contact angle between droplet 130 and surface 132 as shown in FIG. 6A. Young's equation yields a single, unique solution at which the sum of these three surface energies is minimized. This minimum energy state defines the shape of droplet 130. For example, a water droplet submerged in an air background medium will "bead up" when placed on a surface formed of Teflon® material, as the droplet adapts to minimize the total surface energy of the droplet-background medium-surface system. The "contact line" is the line at which the three aforementioned interfaces intersect, shown at 138 in FIGS. 6A and 6B. Since droplet 130 is a semi-sphere, contact line 138 is a circle at the base of droplet 130 where it contacts surface 132.

It is well known that the surface energy relationships at contact line 138 can be changed via "electro-wetting" by applying an electric field between droplet 130 and an electrically insulated electrode 140 located beneath surface 132. Specifically, consider the case of a conductive (e.g. water) droplet 130 on surface 132. An electrical potential source 142 can be electrically connected to apply an electrical potential between electrode 140 and droplet 130. This subjects droplet 130 to an electric field, increasing the surface area of droplet 130 as it adapts to minimize the total surface energy of the droplet-background medium-surface system by assuming a somewhat flattened shape 130A (shown in dotted outline in FIGS. 6A and 6B). The surface area increase causes a corresponding contact angle reduction (indicated at $\theta_2$ in FIG. 6A) and a corresponding expansion of the circular contact line (indicated at 138A in FIGS. 6A and 6B) as the droplet spreads out on surface 132.

In theory, electro-wetting can be used to efficiently and reproducibly change the shape of droplet 130 on surface 132. However, in practice, surface 132 is insufficiently smooth, or insufficiently chemically homogeneous, or both. Porosity of surface 132, or the presence of chemical impurities or dust particles on surface 132 unpredictably affects the contact angle θ, causing friction as the contact line moves across surface 132. Such friction results in "contact angle hysteresis," disrupting accurately reversible movement of droplet 130 from an initial position to an intermediate position and back to the same initial position. Efficient, accurately reversible movement of droplet 130 between different positions is a desirable attribute in a number of applications, but attainment of that attribute is often limited by contact angle hysteresis.

Figure 3C:
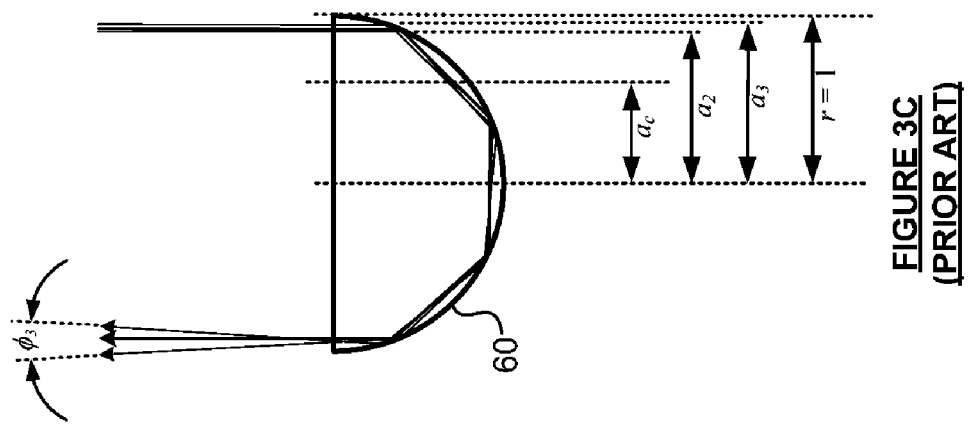
FIGS. 3A, 3B and 3C depict semi-retro-reflection of light rays perpendicularly incident on the FIG. 2 hemi-bead at increasing off-axis distances at which the incident rays undergo TIR two, three and four times respectively.
Figure 3B:
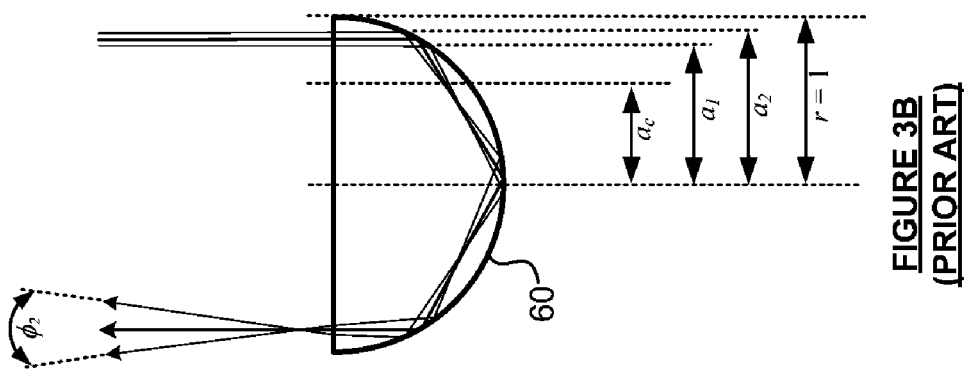
Figure 3A:
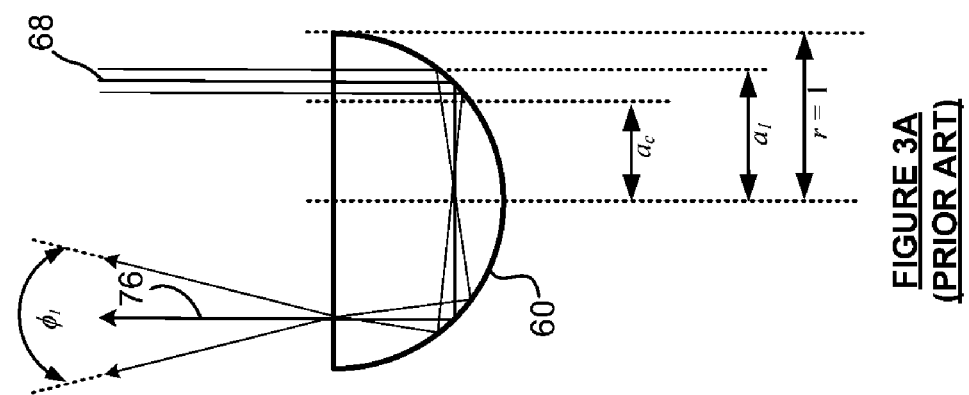
Figure 5:
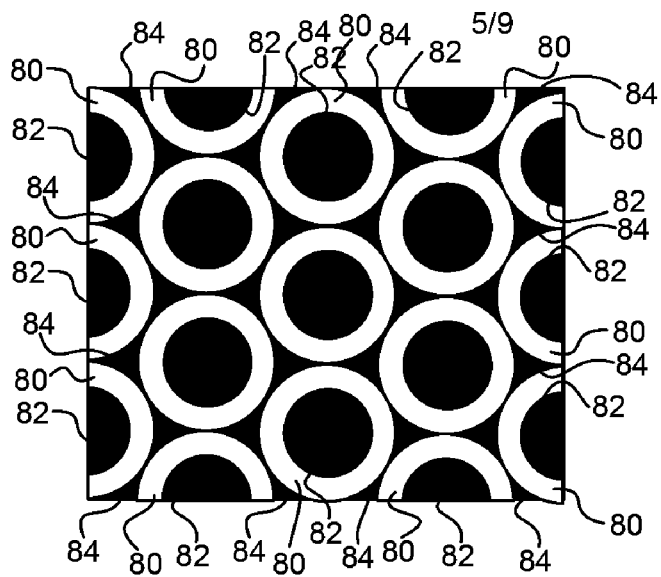
FIG. 5 is a top plan (i.e. as seen from a viewing angle offset 0° from the perpendicular) cross-sectional view of a portion of the FIG. 1 display, showing the spherical beads arranged in a hexagonal closest packed (HCP) structure.

FIGS. 7A and 7B depict a reflective display hemi-bead 120 which does not require particles 26 or electrophoresis medium 20 to electrophoretically modulate TIR. Instead, TIR is modulated in hemi-bead 120 by electrostatically deforming the interface of a light absorptive non-aqueous medium such as oil droplet 122 on substrate 124. Such electro-deformation would ordinarily be inhibited by contact line hysteresis, which would tend to limit efficient, controllable movement of the contact line between droplet 122 and substrate 124, thus impeding accurately reversible movement of droplet 122 between the TIR-frustrating (i.e. non-reflective) position shown in FIGS. 7A and 8A in which droplet 122 has a normally relaxed shape and causes optical interference with light rays that would otherwise be reflected by TIR or transmitted through hemi-bead 120, and the TIR-enabling (i.e. reflective) position shown in FIGS. 7B and 8B in which droplet 122 is deformed into a generally hemi-toroidal shape away from and not contacting hemi-bead 120's central, circular non-reflective region. If droplet 122 is sufficiently absorptive and contacts a sufficiently large portion of hemi-bead 120, then light rays will be adequately absorbed, regardless of whether droplet 122 contacts hemi-bead 120's annular reflective region; or contacts hemi-bead 120's non-reflective, central circular region; or contacts both regions. This is because light rays which strike hemi-bead 120's annular reflective region undergo TIR and are reflected onto hemi-bead 120's non-reflective, central circular region—as previously described in relation to FIGS. 3A, 3B and 3C—whereupon such reflected rays are absorbed. Consequently, it does not matter whether droplet 122 contacts hemi-bead 120's annular reflective region or not.

The aforementioned contact angle hysteresis limitation can be overcome by applying a hydrophilic coating 128 to substrate 124, then patterning substrate 124 to form a plurality of reflective, circular hydrophobic regions 126 atop hydrophilic coating 128, with one region 126 vertically aligned beneath each hemi-bead 120. The diameter of each region 126 is selected, taking into account the spacing between hemi-bead 120 and substrate 124, such that droplet 122 naturally makes optical contact with hemi-bead 120's central, circular non-reflective region.

"Hydrophobic" substances, such as oils, waxes and fats, repel or tend not to combine with water. "Hydrophilic" substances, such as the hydroxyl, carbonyl, carboxyl, amino, sulfhydryl and phosphate functional groups have an affinity for water or are readily absorbed or dissolved in water. Oil droplet 122 may be a droplet of a fluid such as Dow Corning® OS-30 fluid (a volatile methylsiloxane, referred to herein as "oil," available from Dow Corning Corporation, Midland, Mich. 48686). Circular hydrophobic region 126 may be formed by printing a wax-based (i.e. hydrophobic) ink (e.g. ColorStix® 8200 Ink—Black, Xerox Part Number 016 -2044-00, available from Xerox Corporation—Office Group, Wilsonville, Oreg. 97070-1000) directly onto a hydrophilic-coated film (e.g. 132 Medium Blue Colour Effects Lighting Filters, available from Lee Filters, Andover, Hampshire, SP10 5AN, England) using a consumer grade ink printer (e.g. a Phaser® 8200DP Solid Ink Printer, Xerox Part Number 8200DP, available from Xerox Corporation, Wilsonville, Oreg. 97070-1000).

Oil droplet 122 (FIGS. 7A, 7B) is surrounded by an aqueous liquid background medium 150 such as water. Oil droplet 122 has a first refractive index (e.g. about 1.5). Hemi-bead 120 is formed of a hydrophilic substance, or its inward surface (i.e. the surface closest to substrate 124) is coated with a hydrophilic substance. Hemi-bead 120 has a second refractive index (e.g. about 1.5). The first refractive index should not be substantially less than the second refractive index. Oil droplet 122 is absorptive, so it will normally have a higher effective refractive index than hemi-bead 120, since light absorption is caused by the imaginary component of the refractive index. Such higher effective refractive index is desirable. By contrast, a transparent (i.e. non-absorptive) oil having a higher refractive index than hemi-bead 120 is undesirable in the embodiment of FIGS. 7A and 7B. However, regardless of whether oil droplet 122 is absorptive or non-absorptive (as it may be in some cases), it should have a real component of refractive index that is not substantially less than the real component of refractive index of hemi-bead 120. Oil droplet 122 naturally assumes a shape such that about 25% of hemi-bead 120's central, inward surface area (i.e. the area corresponding to hemi-bead 120's central, circular non-reflective region) is in optical contact with oil droplet 122.

Oil droplet 122 may contain a light absorptive dye or dye mixture. Accordingly, light ray 158 incident on hemi-bead 120's non-reflective, central circular region—which would otherwise be refracted through hemi-bead 120 toward substrate 124 as previously described in relation to ray 62 depicted in FIG. 2—is absorbed at the interface between hemi-bead 120 and oil droplet 122, as shown at 160 in FIG. 7A which depicts the TIR-frustrated or non-reflective state. Light ray 162 incident on hemi-bead 120's reflective, annular region—which would otherwise undergo TIR and be reflected back in a direction approximately opposite that of the incident ray as previously described in relation to rays 68, 72, 74, 76 depicted in FIG. 2—is also absorbed at the interface between hemi-bead 120 and oil droplet 122, as shown at 166 in FIG. 7A. More particularly, since oil droplet 122 does not (and need not) contact a significant portion of hemi-bead 120's annular region, light ray 162 initially undergoes TIR at hemi-bead 120's annular region as shown at 164, and is reflected onto hemi-bead 120's non-reflective, central circular region—as previously described in relation to FIGS. 3A, 3B and 3C—whereupon the reflected ray is absorbed as shown at 166 since further TIR of the ray is frustrated by the optical contact of oil droplet 122 with hemi-bead 120's central, circular region.

Oil droplet 122 must be sufficiently close to be in optical contact with hemi-bead 120, that is, within less than 250 nm of hemi-bead 120's inward surface. However, since hemi-bead 120's inward surface is hydrophilic, its surface energy characteristics are such that a microscopically thin layer of water 150 remains between hemi-bead 120's inward surface and oil droplet 122. Accordingly, oil droplet 122 does not adhere to hemi-bead 120's inward surface, and can be easily and reproducibly electro-deformed to move oil droplet 122 away from or toward hemi-bead 120 to modulate TIR as explained below.

Oil droplet 122 wets circular hydrophobic region 126 by leaving a microscopically thin film of oil thereon. More particularly, oil droplet 122 wets the entirety of circular hydrophobic region 126, namely the region within contact line 154 which coincides with the circumference of circular hydrophobic region 126. Contact line 154 does not move—thereby avoiding the aforementioned problems associated with contact line hysteresis—notwithstanding localized changes in the shape of oil droplet 122 which occur as portions of oil droplet 122 bulge, flatten, etc. to minimize the total surface energy of the oil droplet-background medium-surface system in response to different electric fields applied between electrode 156 and background medium (i.e. water) 150.

Figure 9A:
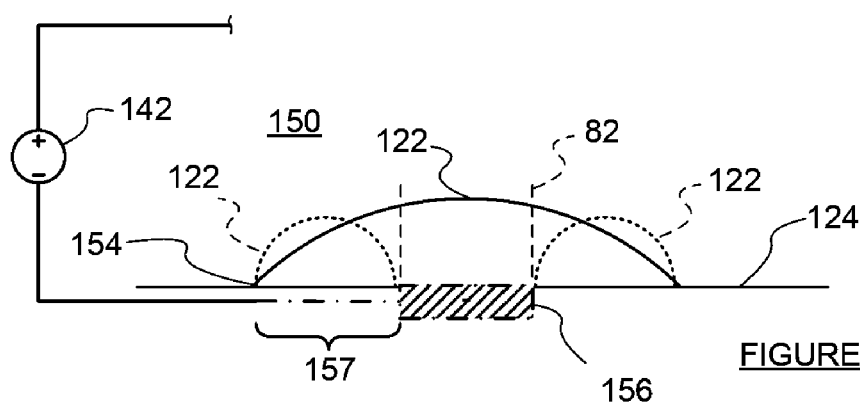
FIGS. 9A and 9B are schematic, cross-sectional side elevation and top plan views, on a greatly enlarged scale, of the fluid droplet of FIGS. 8A and 8B, with an associated electrode and voltage source.
Figure 9B:
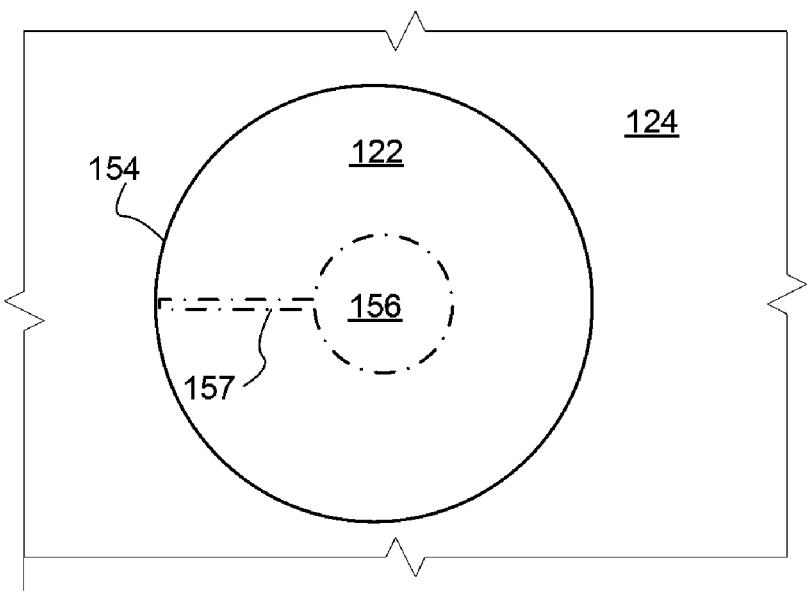

One such electrode 156 is vertically aligned beneath each hemi-bead 120, on the inward side of substrate 124. Each electrode 156 is generally circular is shape, but includes a thin longitudinal portion 157 (FIG. 9B) which extends to the edge of droplet 122 as shown in FIGS. 9A and 9B. The circular portion of electrode 156 has approximately the same diameter as hemi-bead 120's non-reflective, central circular region (i.e. the region analogous to hemi-bead 60's non-reflective region 82 shown in FIGS. 4A-4G and 9A). As shown in FIGS. 9A and 9B, electrical potential source 142 is electrically connected to controllably apply an electrical potential between each electrode 156, 157 and background medium (water) 150. Longitudinal electrode portion 157 facilitates electrical connection between circular electrode portion 156 and electrical potential source 142. Longitudinal electrode portion 157 also facilitates deformation of droplet 122 by application of a relatively small electrical potential (i.e. less than several hundred volts and ideally considerably less than several hundred volts—assuming that longitudinal electrode portion 157 has a very thin insulating coating).

Figure 11A:
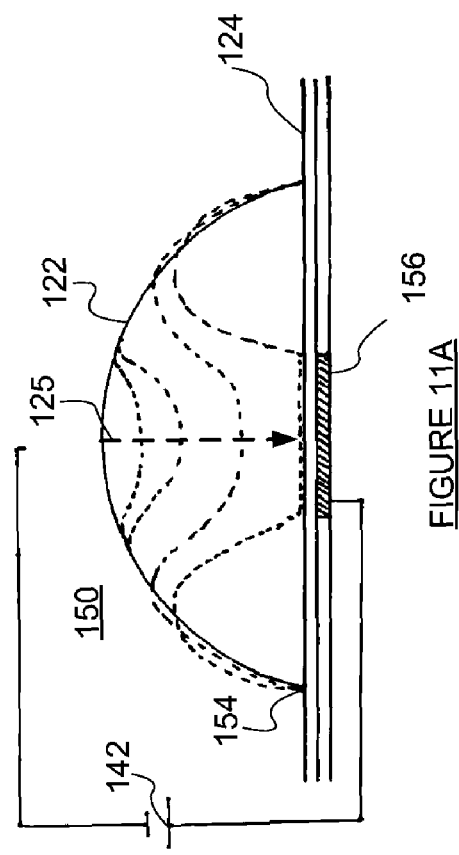
FIGS. 11A, 11B and 11C schematically illustrate droplet deformation.
Figure 11C:
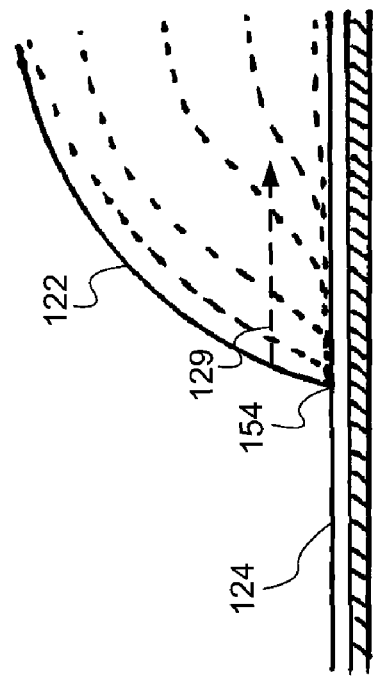
Figure 11B:
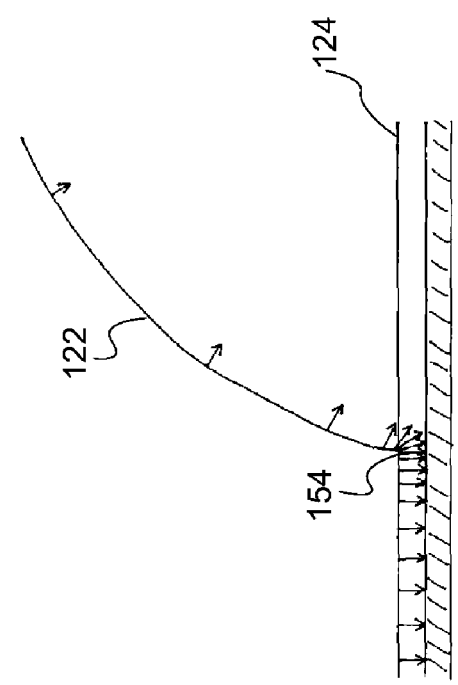

Although not wishing to be bound by any theory, the inventor believes that since droplet 122 is thickest at its center, the electrostatic pressure required to deform droplet 122 to remove substantially all oil from the droplet's central region would require an extremely large electric field and hence require application of a very high electrical potential. This is schematically shown in FIG. 11A in which the dashed lines represent progressive stages of deformation of droplet 122 toward substrate 124 as indicated by dashed arrow 125. However, if longitudinal electrode portion 157 extends to the edge of droplet 122, then application of a relatively small electrical potential initiates deformation of droplet 122—not from the droplet's center as shown in FIG. 11A—but from the droplet's outer edge (i.e. the edge coinciding with contact line 154) where droplet 122 is thin and where the electric field concentration is high due to the electrode's shape. This is shown in FIGS. 11B and 11C. Specifically, the closely-spaced arrows in FIG. 11B represent relatively high concentration of electric field lines near the edge of droplet 122 (i.e. the edge coinciding with contact line 154), and the widelyspaced arrows represent relatively low concentration of electric field lines away from the edge of droplet 122. The dashed lines in FIG. 11C schematically illustrate progressive stages of inward deformation of droplet 122 in the direction of dashed arrow 129, when droplet 122 is subjected to an electric field as shown in FIG. 11B. The gap in the electro-deformed droplet 122 shown in FIG. 8B represents a depression in the droplet's otherwise generally hemi-toroidal shape, such depression coinciding with longitudinal electrode portion 157, it being understood that a thin fluid (i.e. oil) film nevertheless remains on hydrophobic region 126 in this depressed region of droplet 122.

Background medium 150 (e.g. water) is attracted toward substrate 124 by the electric field around electrode 156. Since the water does not completely displace the oil (i.e. a microscopically thin film of oil remains on circular hydrophobic region 126) contact line 154 does not move. More particularly, as oil droplet 122's shape changes to minimize the total surface energy of the oil-water system, contact line 154 remains in the same position—coinciding with the circumference of circular hydrophobic region 126—throughout a wide range of droplet shape changes. Since oil droplet 122 is stable for a wide range of shapes, contact line 154 does not move, even if droplet 122 undergoes substantial deformation. Oil droplet 122 is thus confined atop circular hydrophobic region 126, within circular contact line 154.

The shape of oil droplet 122 on circular hydrophobic region 126 can be rapidly altered by applying an electric field across droplet 122, between electrode 156 and background medium (water) 150. When the field is applied, the high dielectric constant water tends to move into the high electric field region, so as to minimize the total surface energy of the system, consequently deforming the low dielectric constant oil droplet 122 by squeezing (i.e. electro-deforming) it away from the high electric field region into a generally hemi-toroidal shape such that the droplet is away from and does not contact the central, non-reflective region of hemi-bead 120, as seen in FIG. 7B. Oil droplet 122 can be rapidly, reversibly moved on circular hydrophobic region 126 between the relaxed, non-reflective shape and the electro-deformed, reflective shape shown in FIGS. 7A and 7B respectively by suitably varying the electric field applied across droplet 122. The volume of oil in relaxed droplet 122 (FIGS. 7A and 8A) remains the same as the volume of oil in electro-deformed droplet 122 (FIGS. 7B and 8B).

In the electro-deformed, TIR-enabled (i.e. reflective) state shown in FIG. 7B, oil droplet 122 is squeezed (i.e. deformed) away from and does not contact any portion of hemi-bead 120. A thin layer of oil nevertheless remains on and coats the entirety of circular hydrophobic region 126, within contact line 154, including the central portion of circular hydrophobic region 126 directly beneath hemi-bead 120's non-reflective, central circular region. In this electro-deformed, reflective state, light ray 158 incident on hemi-bead 120's non-reflective, central circular region is refracted through hemi-bead 120 toward substrate 124 which reflects the ray back through hemi-bead 120 in a direction approximately opposite that of incident ray 158 as shown at 166 in FIG. 7B. Light ray 162 incident on hemi-bead 120's reflective, annular region undergoes TIR within hemi-bead 120 and is reflected back in a direction approximately opposite that of incident ray 162, as shown at 168 in FIG. 7B.

The transition between the FIG. 7A TIR-frustrated (i.e. non-reflective) state and the FIG. 7B TIR-enabled (i.e. reflective) state is completely defined by the energetics of the system. Consequently, the transition can occur extremely quickly and reproducibly, facilitating construction of a display capable of displaying full motion video images. Moreover, since the embodiment of FIGS. 7A and 7B does not require particles 26, potential problems associated with particle agglomeration are avoided.

The optical properties of substrate 124, hydrophobic regions 126 and hydrophilic coating 128 are not critical. It is only desirable that central area 127 above and corresponding to electrode 156 (i.e. the area within oil droplet 122's electro-deformed generally hemi-toroidal shape shown in FIGS. 7B and 8B) be either specularly or diffusely reflective. For example, substrate 124, hydrophobic regions 126 and hydrophilic coating 128 may each be either specularly or diffusely reflective; or hydrophobic regions 126 may be transparent, with hydrophilic coating 128 and substrate 124 both being either specularly or diffusely reflective; or hydrophobic regions 126 and hydrophilic coating 128 may both be transparent, with substrate 124 being either specularly or diffusely reflective.

Figure 12A:
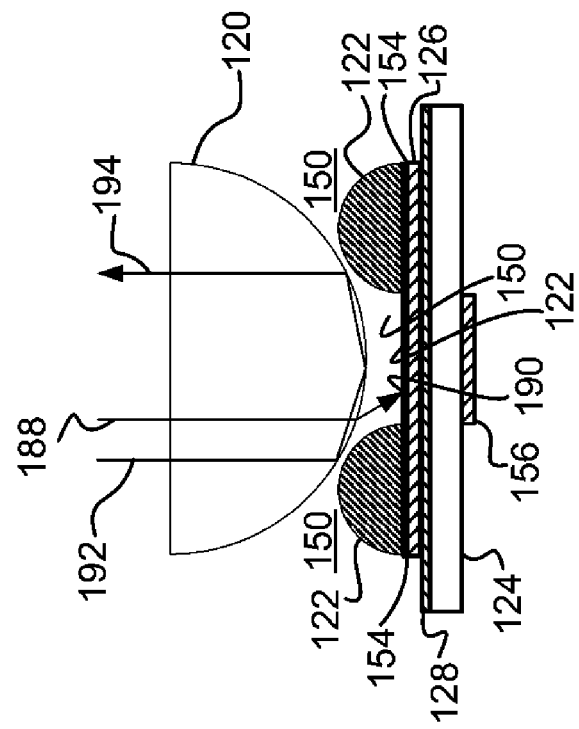
FIGS. 12A and 12B are cross-sectional side elevation views, on a greatly enlarged scale, of a reflective display hemi-bead in which TIR is modulated by electro-deformation of a fluid interface relative to an absorptive substrate, with FIG. 12A depicting the relaxed, TIR-frustrated (non-reflective) state and FIG. 12B depicting the electro-deformed, TIR-enabled (reflective) state.
Figure 12B:
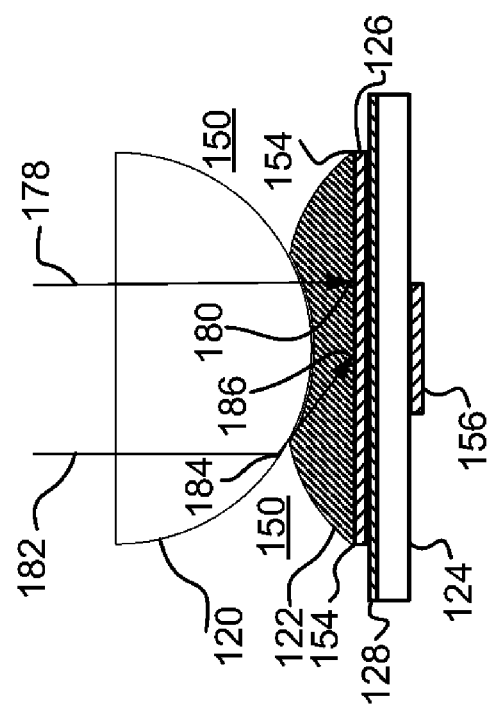

FIGS. 12A and 12B depict an embodiment in which the uppermost portion of substrate 124, namely hydrophobic region 126, is absorptive, instead of being reflective as previously described in relation to FIGS. 7A, 7B, 10A and 10B. Also, in the embodiment of FIGS. 12A and 12B, droplet 122 is non-absorptive (i.e. transparent) instead of being absorptive as in the case of droplet 122 previously described in relation to FIGS. 7A, 7B, 10A and 10B. Droplet 122 thus has a higher refractive index than hemi-bead 120 in the embodiment of FIGS. 12A and 12B. FIG. 12A depicts the TIR-frustrated or non-reflective state in which droplet 122 has a normally relaxed shape and causes optical interference with light rays that would otherwise be reflected by TIR or transmitted through hemi-bead 120. FIG. 12B depicts the TIR-enabling (i.e. reflective) state in which droplet 122 is deformed into a generally hemi-toroidal shape away from and not contacting hemi-bead 120's central, circular non-reflective region.

Figure 2:
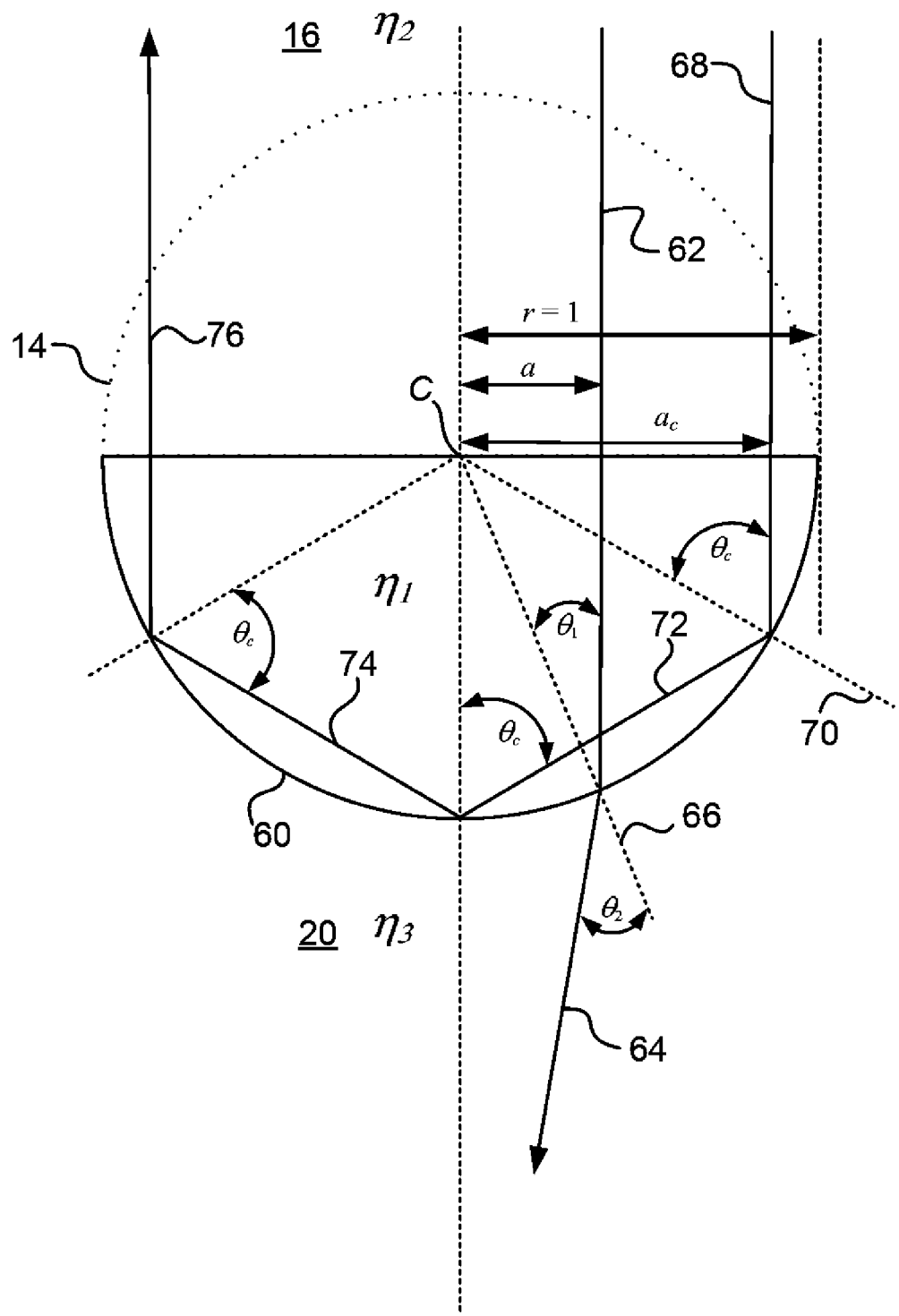
FIG. 2 is a cross-sectional side elevation view, on a greatly enlarged scale, of a hemispherical ("hemi-bead") portion of one of the spherical beads of the FIG. 1A apparatus.

In the TIR-frustrated or non-reflective state (FIG. 12A) light ray 178 incident on hemi-bead 120's non-reflective, central circular region is refracted through hemi-bead 120 and droplet 122 toward substrate 124 as previously described in relation to ray 62 depicted in FIG. 2, and is absorbed by absorptive hydrophobic region 126 as shown at 180. Light ray 182 incident on hemi-bead 120's reflective, annular region initially undergoes TIR as indicated at 184, but the reflected ray is then refracted through hemi-bead 120 and droplet 122 toward substrate 124 and is also absorbed by absorptive hydrophobic region 126 as shown at 186 in FIG. 12A.

In the electro-deformed, TIR-enabled (i.e. reflective) state shown in FIG. 12B, oil droplet 122 is squeezed (i.e. deformed) away from and does not contact any portion of hemi-bead 120. A thin layer of oil nevertheless remains on and coats the entirety of circular hydrophobic region 126, within contact line 154, including the central portion of circular hydrophobic region 126 directly beneath hemi-bead 120's non-reflective, central circular region. In this electro-deformed, reflective state, light ray 188 incident on hemi-bead 120's non-reflective, central circular region is refracted through hemi-bead 120 toward substrate 124 and is absorbed by absorptive hydrophobic region 126 as shown at 190 in FIG. 12B. Light ray 192 incident on hemi-bead 120's reflective, annular region undergoes TIR within hemi-bead 120 and is reflected back in a direction approximately opposite that of incident ray 192, as shown at 194 in FIG. 12B. It can thus be seen that a substantial fraction of light rays incident on hemi-bead 120's non-reflective, central circular region are transmitted through hemi-bead 120 to substrate 124 when droplet 122 is in the electro-deformed, reflective state shown in FIG. 12B.

Although some light rays are absorbed in the electro-deformed, TIR-enabled (i.e. reflective) state shown in FIG. 12B, the embodiment of FIGS. 12A and 12B nevertheless has practical application. For example, it may be more feasible in some cases to provide an absorptive substrate than to provide a sufficiently absorptive fluid medium (e.g. oil containing a light absorptive dye) to yield adequate light absorption in the previously described embodiments of FIGS. 7A & 7B and 10A & 10B.

Figure 10A:
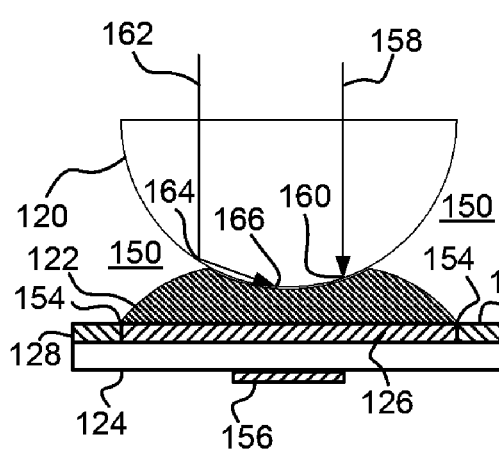
FIGS. 10A and 10B are similar to FIGS. 7A and 7B respectively, but show coplanar hydrophobic and hydrophilic regions atop a substrate.
Figure 10B:
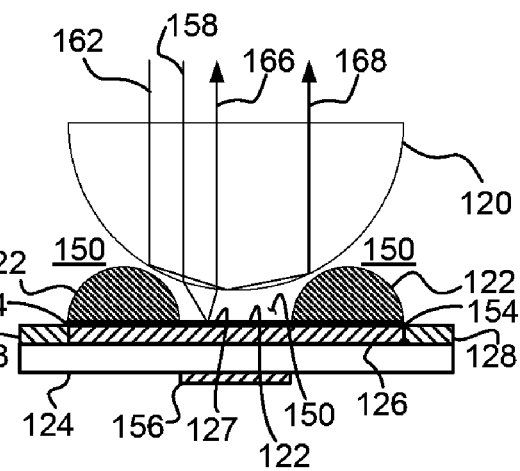

While a number of exemplary aspects and embodiments have been discussed above, those of skill in the art will recognize certain modifications, permutations, additions and sub-combinations thereof. For example, hydrophobic regions 126 need not be patterned atop hydrophilic coating 128 as shown in FIGS. 7A and 7B. Instead, hydrophobic regions 126 may be formed in the same plane as hydrophilic coating 128, as shown in FIGS. 10A and 10B. In this example, hydrophobic regions 126 may be transparent, with substrate 124 and hydrophilic coating 128 each being either specularly or diffusely reflective. It is therefore intended that the following appended claims and claims hereafter introduced are interpreted to include all such modifications, permutations, additions and sub-combinations as are within their true spirit and scope.

What is claimed is:

1. A reflective display, comprising:
   (a) a plurality of inwardly protruding transparent hemi-beads, each hemi-bead having a reflective region surrounding a non-reflective region;
   (b) a substrate spaced inwardly from the hemi-beads;
   (c) for substantially each one of the hemi-beads an associated first fluid droplet having a normally relaxed shape in contact with the non-reflective region of the one of the hemi-beads;
   (d) an electrical potential source electrically connected to apply an electrical potential across any selected one or more of the droplets;
   wherein:
     (i) application of an electrical potential across any selected one of the droplets deforms the selected one of the droplets into a deformed shape away from the one of the hemi-beads associated with the selected one of the droplets; and
     (ii) removal of the electrical potential allows the selected one of the droplets to resume the relaxed shape.

2. A reflective display as defined in claim 1, wherein:
the first fluid is light absorptive; and
a substantial fraction of light rays incident on the reflective region of the one of the hemi-beads are absorbed when the selected one of the droplets has the relaxed shape.

3. A reflective display as defined in claim 2, wherein:
when the selected one of the droplets has the deformed shape, the selected one of the droplets contacts the substrate along a closed loop contact line;
when the selected one of the droplets has the relaxed shape, the selected one of the droplets contacts the substrate along the contact line; and
the application of the electrical potential across the selected one of the droplets deforms the selected one of the droplets inwardly from the contact line and without movement of the contact line.

4. A reflective display as defined in claim 1, wherein the deformed shape is hemi-toroidal and is substantially centered with respect to the one of the hemi-beads associated with the selected one of the droplets.

5. A reflective display as defined in claim 1, wherein:
the substrate is absorptive;
the first fluid is non-absorptive;
a substantial fraction of light rays incident on the non-reflective region of the one of the hemi-beads are transmitted through the one of the hemi-beads to the substrate when the selected one of the droplets has the deformed shape; and
further comprising a second fluid contained between the hemi-beads and the substrate.

6. A reflective display as defined in claim 1, wherein:
the deformed shape is approximately hemi-toroidal and is approximately centered with respect to the one of the hemi-beads associated with the selected one of the droplets;
when the selected one of the droplets has the deformed shape, the selected one of the droplets contacts the substrate along a closed loop contact line;
when the selected one of the droplets has the relaxed shape, the selected one of the droplets contacts the substrate along the contact line; and
the application of the electrical potential across the selected one of the droplets deforms the selected one of the droplets inwardly from the contact line and without movement of the contact line.

7. A reflective display as defined in claim 1, wherein:
when the selected one of the droplets has the deformed shape, the selected one of the droplets contacts the substrate along a closed loop contact line;
when the selected one of the droplets has the relaxed shape, the selected one of the droplets contacts the substrate along the contact line;
the application of the electrical potential across the selected one of the droplets deforms the selected one of the droplets inwardly from the contact line and without movement of the contact line; and
further comprising a second fluid contained between the hemi-beads and the substrate.

8. A reflective display as defined in claim 1, wherein:
when the selected one of the droplets has the deformed shape, the selected one of the droplets contacts the substrate along a closed loop contact line;
when the selected one of the droplets has the relaxed shape, the selected one of the droplets contacts the substrate along the contact line;
the application of the electrical potential across the selected one of the droplets deforms the selected one of the droplets inwardly from the contact line and without movement of the contact line;
the display further comprising, for substantially each one of the hemi-beads:
an associated electrode, each electrode having:
   a substantially circular portion aligned beneath the non-reflective region of the one of the hemi-beads, and
   a thin longitudinal portion extending from the circular portion to the contact line.

9. A reflective display as defined in claim 1, wherein:
the substrate is absorptive;
the first fluid is non-absorptive;
a substantial fraction of light rays incident on the non-reflective region of the one of the hemi-beads are transmitted through the one of the hemi-beads to the substrate when the selected one of the droplets has the deformed shape;

when the selected one of the droplets has the deformed shape, the selected one of the droplets contacts the substrate along a closed loop contact line;

when the selected one of the droplets has the relaxed shape, the selected one of the droplets contacts the substrate along the contact line;

the application of the electrical potential across the selected one of the droplets deforms the selected one of the droplets inwardly from the contact line and without movement of the contact line;

the substrate is specularly reflective;

the deformed shape exposes a portion of the substrate; and the exposed portion is approximately centered with respect to the one of the hemi-beads associated with the selected one of the droplets.

10. A reflective display as defined in claim 3, further comprising a second fluid contained between the hemi-beads and the substrate, the display further comprising, for substantially each one of the hemi-beads:

an associated electrode, each electrode having:
a substantially circular portion aligned beneath the non-reflective region of the one of the hemi-beads, and
a thin longitudinal portion extending from the circular portion to the contact line.

11. A reflective display as defined in claim 7, wherein the deformed shape is hemi-toroidal and is substantially centered with respect to the one of the hemi-beads associated with the selected one of the droplets, the display further comprising, for substantially each one of the hemi-beads:

an associated electrode, each electrode having:
a substantially circular portion aligned beneath the non-reflective region of the one of the hemi-beads, and
a thin longitudinal portion extending from the circular portion to the contact line.

12. A reflective display as defined in claim 7, wherein the first fluid is oil and the second fluid is water, the display further comprising, for substantially each one of the hemi-beads:

an associated electrode, each electrode having:
a substantially circular portion aligned beneath the non-reflective region of the one of the hemi-beads, and
a thin longitudinal portion extending from the circular portion to the contact line.

13. A method of increasing the reflectance of a reflective display having a plurality of inwardly protruding transparent hemi-beads, each hemi-bead having a reflective region surrounding a non-reflective region, the method comprising:

providing an associated first fluid droplet for substantially each one of the hemi-beads, each droplet having a normally relaxed shape in contact with the non-reflective region of the one of the hemi-beads; and deforming selected ones of the droplets to give each selected one of the droplets a deformed shape away from the non-reflective region of the one of the hemi-beads associated with the selected one of the droplets.

14. A method as defined in claim 13, wherein deforming selected ones of the droplets further comprises applying an electrical potential across the selected ones of the droplets and wherein removal of the electrical potential allows the selected ones of the droplets to resume the relaxed shape.

15. A method as defined in claim 13, wherein:
the first fluid is light absorptive; and
a substantial fraction of light rays incident on the non-reflective region of the one of the hemi-beads are totally internally reflected when the selected one of the droplets has the deformed shape.

16. A method as defined in claim 13, wherein the first fluid is light absorptive, the method further comprising spacing a reflective substrate inwardly from the hemi-beads, and wherein deforming selected ones of the droplets further comprises exposing a portion of the substrate, the exposed portion being approximately centered with respect to the one of the hemi-beads associated with the selected one of the droplets.

17. A method as defined in claim 16, wherein:
the hemi-beads are hydrophilic;
the substrate is hydrophilic; and
the method further comprising providing, for substantially each one of the hemi-beads, a hydrophobic region on the substrate aligned with the one of the hemi-beads.

18. A method as defined in claim 16, further comprising containing a second fluid between the hemi-beads and the substrate.

19. A method as defined in claim 18, wherein the first fluid is oil and the second fluid is water.

20. A reflective display as defined in claim 12, wherein:
the substrate is specularly reflective;
the deformed shape exposes a portion of the substrate; and
the exposed portion is approximately centered with respect to the one of the hemi-beads associated with the selected one of the droplets.

21. A reflective display as defined in claim 12, wherein:
the first fluid is light absorptive;
a substantial fraction of light rays incident on the reflective region of the one of the hemi-beads are absorbed when the selected one of the droplets has the relaxed shape;
the deformed shape is hemi-toroidal and is substantially centered with respect to the one of the hemi-beads associated with the selected one of the droplets;
the substrate is diffusely reflective;
the deformed shape exposes a portion of the substrate;
the exposed portion is approximately centered with respect to the one of the hemi-beads associated with the selected one of the droplets;
the hemi-beads are hydrophilic;
the substrate is hydrophilic; and
the display further comprising, for substantially each one of the hemi-beads a hydrophobic region aligned with the one of the hemi-beads.

* * * * *